US012282850B2

(12) United States Patent
Zhu et al.

(10) Patent No.: US 12,282,850 B2
(45) Date of Patent: Apr. 22, 2025

(54) METHOD AND SYSTEM FOR TRAINING MATTING NEURAL NETWORK, AND METHOD AND DEVICE FOR GENERATING PORTRAIT TO BE USED ON IDENTITY DOCUMENT

(71) Applicant: IDEMIA IDENTITY & SECURITY FRANCE, Courbevoie (FR)

(72) Inventors: Hui Zhu, Reston, VA (US); Brian Martin, Reston, VA (US); Rein-Lien HSU, Reston, VA (US)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 420 days.

(21) Appl. No.: 17/837,170

(22) Filed: Jun. 10, 2022

(65) Prior Publication Data

US 2023/0409896 A1 Dec. 21, 2023

(51) Int. Cl.
*G06N 3/08* (2023.01)
*G06T 7/194* (2017.01)
(Continued)

(52) U.S. Cl.
CPC .............. *G06N 3/08* (2013.01); *G06T 7/194* (2017.01); *G06T 7/70* (2017.01); *G06T 11/60* (2013.01);
(Continued)

(58) Field of Classification Search
CPC .......... G06N 3/08; G06N 3/045; G06T 7/194; G06T 7/70; G06T 11/60;
(Continued)

(56) References Cited

U.S. PATENT DOCUMENTS

| 9,286,508 B2 | 3/2016 | Martin |
| 2018/0253865 A1 | 9/2018 | Price et al. |
| 2021/0027470 A1 | 1/2021 | Lin et al. |

FOREIGN PATENT DOCUMENTS

| CN | 110008832 | * | 7/2019 | ........... G06V 40/161 |
| CN | 114120417 | * | 3/2022 | ........... G06F 18/2411 |
| KR | 102400609 | * | 5/2022 | ............... G06N 3/08 |

OTHER PUBLICATIONS

Jue Wang and Michael F. Cohen, "Image and Video Matting: A Survey", in Foundations and Trends® in Computer Graphics and Vision, vol. 3, No. 2, pp. 97-175, 2007.
(Continued)

*Primary Examiner* — Jerome Grant, II
(74) *Attorney, Agent, or Firm* — Oblon, McClelland, Maier & Neustadt, L.L.P.

(57) ABSTRACT

A computer-implemented method and a computing system are provided for training a matting neural network to generate mattes for creating portraits to be used on identity documents. The matting neural network is trained by using standardized images conforming to a template which prescribes that each standardized image should depict a human face. A standardized image is obtained by adjusting an input image which includes an area representing a face of the person and was, e.g., taken with a camera, so that a relationship between the size of the adjusted input image and the distance between target points (which represent parts of the person) in the adjusted input image satisfies a condition determined by the template, and in the adjusted input image the area is in a position defined by the template.

20 Claims, 11 Drawing Sheets

(51) Int. Cl.
*G06T 7/70* (2017.01)
*G06T 11/60* (2006.01)
(52) U.S. Cl.
CPC .............. *G06T 2207/20132* (2013.01); *G06T 2207/20212* (2013.01)
(58) Field of Classification Search
CPC . G06T 2207/20132; G06T 2207/20212; G06T 2207/20084; G06T 2207/30196; G06T 7/11
USPC .................................................. 382/155, 156
See application file for complete search history.

(56) References Cited

OTHER PUBLICATIONS

Ning Xu et al, "Deep image matting", in Proceedings of the IEEE conference on computer vision and pattern recognition, 2017.
Soumyadip Sengupta et al, "Background Matting: The World is Your Green Screen", in Proceedings of the IEEE/CVF Conference on Computer Vision and Pattern Recognition, pp. 2291-2300, 2020.
Shanchuan Lin et al, "Real-Time High-Resolution Background Matting", arXiv preprint arXiv:2012.07810, 2020.
Xiaoyong Shen et al, "Deep automatic portrait matting" in Proceedings of the European Conference on Computer Vision, pp. 92-107, 2016.
Quan Chen et al, "Semantic human matting" in Proceedings of the 26th ACM International Conference on Multimedia, pp. 618-626, 2018.
Xian Wu et al, "A joint matting network for automatic human matting" in Computational Visual Media, vol. 6, No. 2, pp. 215-224, 2020.
Zhanghan Ke et al, "MODNet: Real-Time Trimap-Free Portrait Matting via Objective Decomposition", arXiv preprint arXiv:2011.11961, 2020.
Brian. L. Price et al, "Simultaneous foreground, background, and alpha estimation for image matting", 2010 IEEE Computer Society Conference on Computer Vision and Pattern Recognition, 2010, pp. 2157-2164, doi: 10.1109/CVPR.2010.5539895.
Naimish Agarwal et al, "Facial Key Points Detection using Deep Convolutional Neural Network—NaimishNet", arXiv preprint arXiv:1710.00977, 2017.

\* cited by examiner

METHOD AND SYSTEM FOR TRAINING MATTING NEURAL NETWORK, AND METHOD AND DEVICE FOR GENERATING PORTRAIT TO BE USED ON IDENTITY DOCUMENT

TECHNICAL FIELD

The present disclosure relates generally to the field of image matting, and, in particular, to a computer-implemented method and computing system for training a matting neural network, and a computer-implemented method and computing device for generating a portrait to be used on an identity document.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Identity (hereinafter "ID") documents, such as driver's licenses, passports, employee or student ID cards, etc., are issued by governmental or non-governmental entities to individuals for providing evidence of their identities. A portrait is usually required for each ID document, which often needs to have a particular background color. Traditionally, ID photos are taken by professional photographers at photographic studios or at the offices of ID documents issuing authorities in front of solid color backdrops to ensure that the photos have the required background colors. To facilitate ID document application and issuance process, nowadays many people are allowed to take portraits using hand-held mobile devices against arbitrary backgrounds, and photo editing software is then used to change the backgrounds of the portraits into the required backgrounds. A digital background replacing the original background in an image is called a virtual backdrop.

Early methods for creating virtual backdrops used traditional image processing algorithms to segment an original image into a foreground and a background, mask the original background, and then replace the masked background with a new background. Examples of such early methods can be found in the U.S. Pat. No. 9,286,508B2 and the following publication: Jue Wang and Michael F. Cohen, "Image and Video Matting: A Survey", in *Foundations and Trends® in Computer Graphics and Vision*, Vol. 3, No. 2, pp 97-175, 2007.

To produce better segmentation results, recently developed approaches use deep-learning-based algorithms to generate mattes for images and then use the mattes to erase the original backgrounds from the images. Such algorithms are referred to as "deep-learning-based matting algorithms" herein.

Some of the existing deep-learning-based matting algorithms require an auxiliary input, such as a pre-defined tri-map or another image only showing the original background, to facilitate generation of the mattes, and examples thereof can be found in the following publications: Ning Xu et al, "Deep image matting", in *Proceedings of the IEEE conference on computer vision and pattern recognition*, 2017; Soumyadip Sengupta et al, "Background Matting: The World is Your Green Screen", in *Proceedings of the IEEE/CVF Conference on Computer Vision and Pattern Recognition*, pp 2291-2300, 2020; and Shanchuan Lin et al, "Real-Time High-Resolution Background Matting", *arXiv preprint arXiv:2012.07810*, 2020. A trimap is a rough tri-value mask which divides an image into three regions, i.e., a definite foreground, a definite background, and a blended region where pixels are considered as a mixture of foreground and background colors. The blended region is typically the boundary between the definite foreground and the definite background. These auxiliary inputs are sometimes computationally expensive to obtain, suffer from low accuracy, or require manual annotation.

Accordingly, many efforts have been made, e.g., by Xiaoyong Shen et al in "Deep automatic portrait matting" in *Proceedings of the European Conference on Computer Vision*, pp 92-107, 2016, to make the deep-learning-based matting algorithms only take a single input, the original image. Deep-learning-based matting algorithms usually have an encoder-decoder architecture, like the U-Net. The encoder normally adopts as the backbone an existing convolutional neural network (hereinafter "CNN") pre-trained using a popular image classification dataset, such as ImageNet. For example, Quan Chen et al in "Semantic human matting" in *Proceedings of the 26th ACM International Conference on Multimedia*, pp 618-626, 2018, and Xian Wu et al, in "A joint matting network for automatic human matting" in *Computational Visual Media*, Vol. 6, No. 2, pp 215-224, 2020, used ResNet-50 for the encoder, which is relatively large in model size, causing slow computing speed and large memory occupation in computers. Recently, Zhanghan Ke et al in "MODNet: Real-Time Trimap-Free Portrait Matting via Objective Decomposition", *arXiv preprint arXiv:2011.11961*, 2020, used a smaller and faster network, MobileNetV2, as the encoder backbone.

However, when applied in mobile, desktop, or web applications intended for creating ID photos based on portraits originally taken against arbitrary backgrounds, existing deep-learning-based matting algorithms hardly achieve outstanding performance: the existing algorithms have complicated neural network structures and process photos at unsatisfactory speeds, or the accuracy of the generated mattes are unsatisfactory.

SUMMARY

Except for the phrases "one or more" and "either . . . or", and unless otherwise stated, the word "or" herein is to be understood as "and/or".

As is known in the art, an image may be considered as including a foreground and a background. A matte (sometimes referred to as an alpha matte) of an image indicates a percentage of foreground color that exists in association with each pixel in the image, and categorizes each pixel of the image as containing only foreground information, only background information, or alternatively both foreground and background information. As such, the matte may enable the separation of the foreground from the original background and the compositing of the foreground onto a new background.

The embodiments of the disclosure are intended for facilitating efficient and effective generation of ID photos from portraits taken against arbitrary backgrounds. To this end, some embodiments provide techniques which use standardized images having various backgrounds and conforming to a template to train a matting neural network to specially produce mattes for images conforming to the template. The template shares the following characteristics with ID photo templates so as to simplify the structure of the special-purpose matting neural network and to improve the quality of the mattes generated by the matting neural network: it prescribes that each image conforming to it should include an area representing the face of a person, determines a condition to be satisfied by a relationship between the size of the image and the distance between target points representing parts of the person in the image, and defines a position in the image to be occupied by the area. Accordingly, other embodiments described herein take advantage of the special training process of the matting neural network and provide techniques which standardize user-input portraits according to the template so as to use the trained matting neural network to predict high-quality mattes for the standardized portraits swiftly, and then create ID photos based on the predicted mattes.

In particular, the disclosure describes a computer-implemented method for training a matting neural network according to a first embodiment of the disclosure. The method includes following operations: obtaining standardized images conforming to a template prescribing that each standardized image should depict a human face; and training the matting neural network to generate mattes for images by inputting the standardized images into the matting neural network as training images so that portraits to be used on identity documents can be created based on mattes generated by the trained matting neural network. The obtaining operation in turn includes following operations: receiving an input image including an area representing the face of a person; and generating one of the standardized images by adjusting the input image. A relationship between the size of the adjusted input image and the distance between target points in the adjusted input image satisfies a condition determined by the template, the target points represent parts of the person, and in the adjusted input image the area is in a position defined by the template.

An ID photo usually needs to fit an ID photo template which defines the position and relative size of the region representing a visage in each ID photo of the same type. Similarly, each of the images used for training the matting neural network according to the first embodiment of the disclosure conforms to a template which requires that in each of the images, the area representing the face of a photographed person is in the same pre-defined position and the relative distance between target points representing pre-determined parts of the photographed person is approximately fixed. As such, by using standardized images conforming to the template for training, the method according to the first embodiment of the disclosure can effectively and efficiently train the matting neural network to facilitate ID photo compositing. The architecture of the matting neural network may be the same as or different from that of an existing matting neural network. Comparing with existing matting neural networks which are trained without making any emphasis on ID photos, such as using general training images quite different from ID photos and varying significantly in the relative position of the area representing the visage or the relative distance between the target points, the matting neural network trained using the method according to the first embodiment may minimize the existing problem of domain shift, which is caused by large differences in data characteristics between image samples used in the training phase and images to deal with in the inferencing phase, have a simpler structure (e.g., with fewer neurons or hidden layers), or predict more accurate mattes at a faster speed.

According to an example implementation, the template defines one or more values of a ratio of a dimension of the generated standardized image to the distance between the target points in the generated standardized image. Before adjusting the input image, the generating operation further includes determining the distance between the target points in the input image, and determining the dimension of the adjusted input image according to one of the one or more values of the ratio and the distance in the input image. Adjusting the input image includes adjusting the input image according to the dimension of the adjusted input image and the position defined by the template.

According to an example implementation, adjusting the input image includes cropping the input image.

According to an example implementation, after adjusting the input image, the generating operation further includes resizing the adjusted input image to a standard size defined by the template.

According to an example implementation, the template further prescribes that each standardized image should include a frontal view of the full human face, and the area is a frontal view of the full face of the person.

According to an example implementation, the input image includes views of human faces. Before the generating operation, the obtaining operation further includes
scoring each of the views in the received input image according to a probability that the view is a major view in the received input image, and
selecting the area as the major view, where the area has the highest score level within the views, or, splitting the received input image into sub-images each including one of major views of the input image, where the area is one of the major views.

In the scenario where the received input image includes the multiple major views and is split into the sub-images, the generating operation includes generating the standardized image using one of the sub-images which includes the area. And the obtaining operation further includes generating one or more other standardized images using one or more other sub-images of the received input image according to the template.

According to an example implementation, before the generating operation, the obtaining operation further includes: generating a bounding box marking the area in the received input image; and localizing key points within the area. The key points include the target points.

According to an example implementation, before the generating operation, the obtaining operation further includes determining that the value of the ratio of a dimension of the received input image to the distance between the target points in the received input image is greater than or equal to a threshold.

The disclosure further describes a computing system for training a matting neural network according to a second embodiment of the disclosure. The computing system, such as a high-performance computer or a server, includes one or more computer-readable media storing instructions, and one or more processors configured to execute the instructions to perform the method according to any one of the implementations of the first embodiment.

In particular, the one or more processors are configured to execute the instructions to obtain standardized images conforming to a template prescribing that each standardized image should depict a human face, and train the matting neural network to generate mattes for images by inputting the standardized images into the matting neural network as training images so that portraits to be used on identity documents can be created based on mattes generated by the trained matting neural network. In obtaining the standardized images, the one or more processors are configured to receive an input image including an area representing the face of a person, and generate one of the standardized images by adjusting the input image. A relationship between the size of the adjusted input image and the distance between target points in the adjusted input image satisfies a condition determined by the template. The target points represent parts of the person. In the adjusted input image the area is in a position defined by the template.

According to an example implementation, the template defines one or more values of a ratio of a dimension of the generated standardized image to the distance between the target points in the generated standardized image. In generating the standardized image, prior to adjusting the input image, the one or more processors are further configured to determine the distance between the target points in the input image, and determine the dimension of the adjusted input image according to one of the one or more values of the ratio and the determined distance in the input image. In adjusting the input image, the one or more processors are configured to adjust the input image according to the dimension of the adjusted input image and the position defined by the template.

According to an example implementation, in adjusting the input image, the one or more processors are configured to crop the input image.

According to an example implementation, in generating the standardized image, the one or more processors are further configured to resize the adjusted input image to a standard size defined by the template after adjusting the input image.

According to an example implementation, the template further prescribes that each standardized image should include a frontal view of the full human face, and the area is a frontal view of the full face of the person.

According to an example implementation, the input image includes views of human faces. In obtaining the standardized images, prior to generating the standardized image, the one or more processors are further configured to
- score each of the views in the received input image according to a probability that the view is a major view in the received input image, and
- select the area as the major view, where the area has the highest score level within the views, or, split the received input image into sub-images each including one of major views of the input image, where the area is one of the major views.

In the scenario where the received input image includes the multiple major views and the processor(s) is configured to split the received input image into the sub-images, in generating the standardized image, the one or more processors are further configured to generate the standardized image using one of the sub-images which includes the area. And in obtaining the standardized images, the one or more processors are further configured to generate one or more other standardized images using one or more other sub-images of the received input image according to the template.

According to an example implementation, in obtaining the standardized images, the one or more processors are further configured to, prior to generating the standardized image, generate a bounding box marking the area in the received input image and localize key points within the area. The key points include the target points.

According to an example implementation, in obtaining the standardized images, the one or more processors are further configured to determine that the value of the ratio of a dimension of the received input image to the distance in the received input image is greater than or equal to a threshold before generating the standardized image.

The disclosure further describes a computer-implemented method for creating a portrait to be used on an identity document according to a third embodiment of the disclosure. The method includes obtaining an input image including an area representing the face of a person, generating a standardized image conforming to a template by adjusting the input image, inputting the standardized image to a matting neural network trained by using training images conforming to the template, obtaining a matte generated by the matting neural network for the standardized image, and creating the portrait based on the matte. A relationship between the size of the adjusted input image and the distance between target points in the adjusted input image satisfies a condition determined by the template. The target points represent parts of the person. In the adjusted input image the area is in a position defined by the template. The template prescribes that the standardized image should depict a human face.

As such, by generating a standardized image depicting a human face from an input image (e.g., a selfie taken by a user desiring to obtain an ID photo based on the matte generated for the selfie using the method according to the third embodiment) and then using a matting neural network focusing on such standardized images to generate a matte for the standardized image, the method according to the third embodiment of the disclosure can minimize the existing problem of domain shift and generate the matte precisely at a fast speed, thereby effectively and efficiently facilitating generation of an ID photo of the human based on the matte.

According to an example implementation, the creating operation further includes extracting a foreground image from the standardized image based on the matte, combining the extracted foreground image and a background image to generate a composite image of the person, and adjusting the composite image to generate the portrait according to requirements of the identity document.

Example implementations of the first embodiment apply, mutatis mutandis, to the third embodiment.

For instance, according to an example implementation, the template defines a value of the ratio of a dimension of the standardized image to the distance between the target points in the standardized image. Adjusting the input image includes adjusting the input image according to the value and the position.

According to an example implementation, adjusting the input image includes cropping the input image.

According to an example implementation, after adjusting the input image, the generating operation further includes resizing the adjusted input image to a standard size defined by the template.

According to an example implementation, the template further prescribes that the standardized image should include a frontal view of the full human face, and the area is a frontal view of the full face of the person.

According to an example implementation, the input image includes views of human faces. For example, the input image depicts the face of the person for whom an ID photo is to be generated, as well as the faces of other people walking behind the person when the photo was taken. Since with the same camera people are usually photographed one by one for ID documents, the input image normally contains only one major view. As such, before the generating operation, the method further includes scoring each of the views in the obtained input image according to the probability that the view is the major view in the obtained input image, and selecting the area as the major view. The area has the highest score level within the views.

According to an example implementation, before the generating operation, the method further includes generating a bounding box marking the area in the obtained input image and localizing key points within the area. The key points include the target points.

According to an example implementation, before the generating operation, the method further includes determining that the value of the ratio of a dimension of the obtained input image to the distance between the target points in the obtained input image is greater than or equal to a threshold.

The disclosure further describes a computing device for creating a portrait to be used on an identity document according to a fourth embodiment. The computing device may be a user device, a hand-held mobile device, a self-service kiosk machine, or a remote picture-capturing web server, and includes one or more computer-readable media storing instructions, and one or more processors configured to execute the instructions to perform the method according to any one of the implementations of the third embodiment.

In particular, the one or more processors are configured to execute the instructions to obtain an input image including an area representing the face of a person, generate a standardized image conforming to a template by adjusting the input image, input the standardized image to a matting neural network trained by using training images conforming to the template, obtain a matte generated by the matting neural network for the standardized image, and create the portrait based on the matte. A relationship between the size of the adjusted input image and the distance between target points in the adjusted input image satisfies a condition determined by the template. The target points represent parts of the person. In the adjusted input image the area is in a position defined by the template. The template prescribes that the standardized image should depict a human face.

Example implementations of the third embodiment apply, mutatis mutandis, to the fourth embodiment.

For instance, according to an example implementation of the fourth embodiment, in creating the portrait based on the matte, the one or more processors are further configured to extract a foreground image from the standardized image based on the matte, combine the extracted foreground image and a background image to generate a composite image of the person, and adjust the composite image to generate the portrait according to requirements of the identity document.

According to an example implementation, the template defines a value of the ratio of a dimension of the standardized image to the distance between the target points in the standardized image. In adjusting the input image, the one or more processors are configured to adjust the input image according to the value and the position.

According to an example implementation, in adjusting the input image, the one or more processors are configured to crop the input image.

According to an example implementation, in generating the standardized image, the one or more processors are further configured to resize the adjusted input image to a standard size defined by the template after adjusting the input image.

According to an example implementation, the template further prescribes that the standardized image should include a frontal view of the full human face, and the area is a frontal view of the full face of the person.

According to an example implementation, the input image includes views of human faces. In executing the instructions, prior to generating the standardized image, the one or more processors are further configured to score each of the views in the obtained input image according to the probability that the view is the major view in the obtained input image and select the area as the major view. The area has the highest score level within the views.

According to an example implementation, in executing the instructions, prior to generating the standardized image, the one or more processors are further configured to generate a bounding box marking the area in the obtained input image and localize key points within the area. The key points include the target points.

According to an example implementation, in executing the instructions, prior to generating the standardized image, the one or more processors are further configured to determine that the value of the ratio of a dimension of the obtained input image to the distance between the target points in the obtained input image is greater than or equal to a threshold.

The disclosure further describes one or more non-transitory computer-readable media according to a fifth embodiment of the disclosure. The one or more media are configured to store instructions which, when executed by one or more processors, cause the one or more processors to implement the method for training a matting neural network according to any one of the implementations of the first embodiment, or to implement the method for creating a portrait to be used on an identity document according to any one of the implementations of the third embodiment.

BRIEF DESCRIPTION OF THE DRAWINGS

Embodiments of the disclosure and advantages thereof will be described below in detail, by way of example, with reference to the accompanying schematic drawings introduced as follows.

For simplicity and clarity of illustration, the same reference numerals will be used throughout the figures to refer to the same or like parts, unless indicated otherwise.

DESCRIPTION OF PARTICULAR EMBODIMENTS

Figure 1:
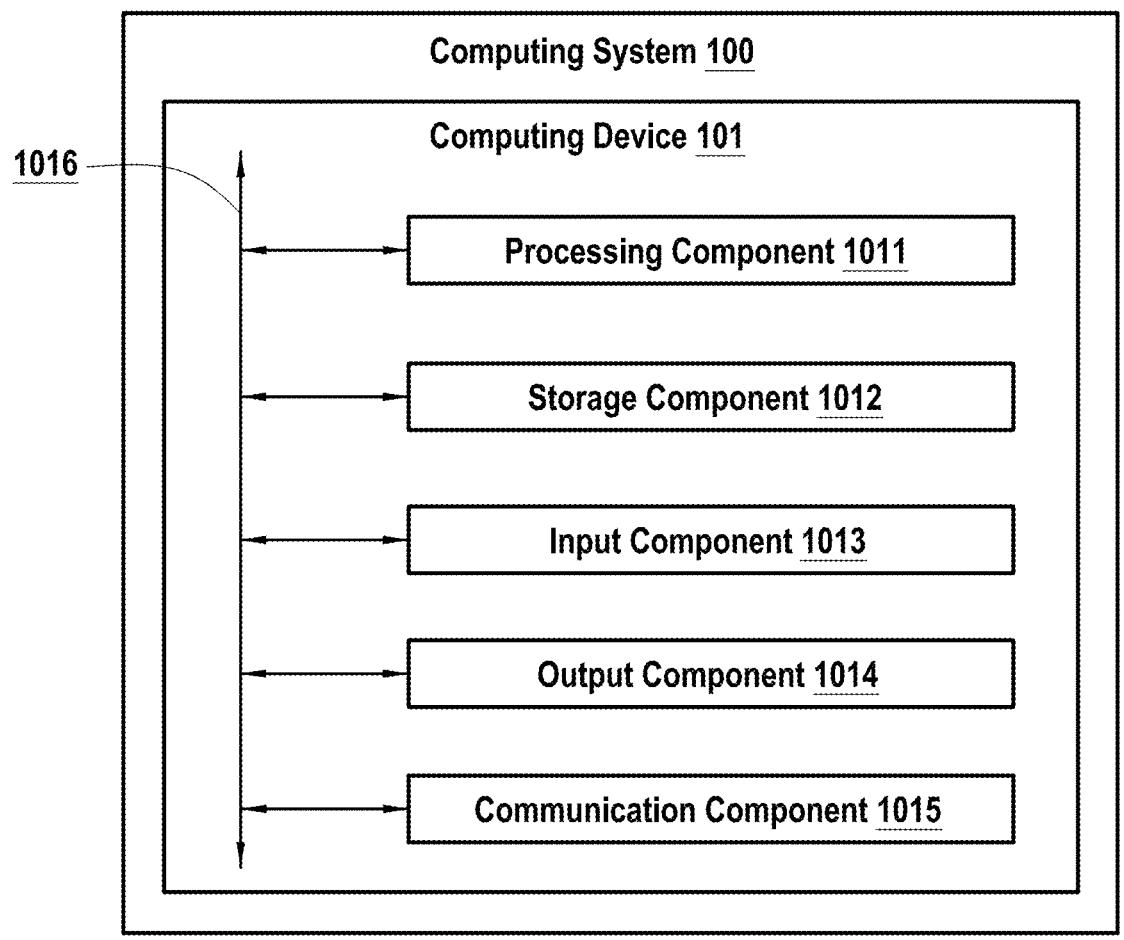
FIG. 1 is a block diagram of an exemplary computing system in accordance with one or more embodiments disclosed herein.

The following description of the example embodiments refers to the accompanying drawings. It does not limit the disclosure. Instead, the scope of the disclosure is defined by the appended claims.

It is to be understood that the figures and description of the present disclosure have been simplified to illustrate elements that are relevant for a clear understanding of the present disclosure, while eliminating, for the purpose of clarity, many other elements found in typical methods, systems and devices with the same or similar functionality.

The flowcharts or block diagrams in the figures illustrate the configuration, operations and functionality of possible implementations of devices, methods and computer program products according to various embodiments of the present disclosure. In this regard, each block in the flowcharts or block diagrams may indicate a module, segment, or portion of code, which includes one or more executable instructions for implementing the specified logical function(s).

The present disclosure utilizes a variety of terms to describe features and benefits of the embodiments. Additional detail is now provided regarding the meaning of these terms.

As used herein, the term "A depicts B" means that at least some pixels of A show B. Relatedly, as used herein, the term "A represents B" means that A includes every pixel which can be identified by the computing system or the computing device as showing B in an image; the reader will understand that some tolerance in precise identification of the pixel(s) may be permitted provided that this does not detract from the manufacturability or functional characteristics of the computing system or the computing device according to embodiments of the disclosure.

Please note that, as mentioned in the "summary" section herein, a pixel of an image may show both the foreground (e.g., representing B) and the background of the image.

As used herein, the terms "image" and "photo" respectively refer to digital image and photo in digital format (in contrast to paper image and paper photo). Relatedly, the term "the size of an image" herein refers to the dimensions of a digital image, which are usually measured in pixels.

Additionally, neural networks, also known as artificial neural networks or simulated neural networks, make up the backbone of deep learning algorithms. A deep neural network is a deep learning model that can be tuned (e.g., trained) based on inputs to approximate unknown functions. It can include a model of interconnected artificial neurons (often organized in more than three layers including an input layer, multiple hidden layers and an output layer) that communicate and learn to approximate complex functions and generate outputs based on a plurality of inputs provided to the model.

As used herein, the term "matting neural network" refers to a deep neural network which performs image matting. As is known in the art, the process of image matting predicts a matte with foreground opacity for each pixel of an image, which is denoted by α in the following formula:

$$I_i = \alpha_i F_i + (1 - \alpha_i) B_i \quad (1)$$

where I denotes the color of the image, F denotes the color of the foreground, B denotes the color of the background, i is the pixel index, and $0 \leq \alpha_i \leq 1$. If $\alpha_i = 1$ for pixel i, then it's a pure foreground pixel.

FIG. 1 illustrates an example computing system 100 including one or more computing devices 101 in which the first embodiment of the present disclosure may be employed. As illustrated by FIG. 1, the one or more computing devices 101 each include one or more processing components 1011, one or more storage components 1012, one or more input components 1013, and one or more output components 1014.

A computing device 101 may be a high-performance computer, a server, a user device (e.g., a laptop computer, a home desktop computer, a mobile device such as a tablet, a smart phone, a wearable device, etc.), an embedded device (e.g., a device embedded within a vehicle, a camera, an image sensor, a household appliance, etc.), a platform having one or more corresponding application programming interfaces (hereinafter "APIs"), a cloud infrastructure, or any other computing device suitable for perform one or more operations of the method according to the first embodiment.

The one or more processing components 1011 are configured to execute instructions stored in the one or more storage components 1012 to perform one or more operations of the method according to the first embodiment. As such, the operations of the method according to the first embodiment may be performed by various computing devices 101 cooperating in a distributed environment, or by a single computing device 101.

Examples of a processing component 1011 include a central processing unit (hereinafter "CPU"), a vision processing unit (hereinafter "VPU"), a graphics processing unit (hereinafter "GPU"), a tensor processing unit (hereinafter "TPU"), a neural processing unit (hereinafter "NPU"), a neural processing engine, a core of a CPU, VPU, GPU, TPU, NPU or another processing device, an application processor, a display controller, an application specific integrated circuit (hereinafter "ASIC"), a field programmable gate array (hereinafter "FPGA"), a coprocessor, or any other hardware configured to function as a processing unit. The one or more processing components 1011 may be embedded within another hardware component such as an image sensor and the like.

The one or more storage components 1012 are configured to store information for processing by the computing device 101, and include one or more computer-readable storage media. A computer-readable storage medium can be any available medium that can be accessed by the computing device 101 in the form of volatile or non-volatile memory. A storage component 1012 may be a random access memory (hereinafter "RAM"), a dynamic random access memory (hereinafter "DRAM"), a static random access memory (hereinafter "SRAM"), any other form of volatile memory known in the art, a magnetic hard disk, an optical disk, a floppy disk, a flash memory, an electrically programmable memory (hereinafter "EPROM"), an electrically erasable and programmable memory (hereinafter "EEPROM"), any other form of non-volatile memory known in the art, a data server, etc.

The one or more input components 1013 are configured to receive input. An input component 1013 may be a touch-sensitive screen, a mouse, a keyboard, a voice response system, a camera, a microphone, or any other device for detecting input from a human or machine.

The one or more output components 1014 are configured to generate output. An output component 1014 may be a video graphics adapter card, a cathode ray tube (hereinafter "CRT") monitor, a liquid crystal display (hereinafter "LCD"), or any other device for generating output to a human or machine.

A computing device 101 may further include one or more communication components 1015. The one or more communication components 1015 are configured to communicate with external devices via wired or wireless network(s) by transmitting or receiving network signals over network(s). Examples of a communication component 1015 include a network interface card such as an Ethernet card, an optical transceiver, a radio frequency transceiver, a universal serial bus controller, or any other device that can send or receive information.

As shown by FIG. 1, the components 1011-1015 may be directly or indirectly coupled to each other physically, communicatively, or operationally via a communication channel 1016. The communication channel 1016 may include one or more buses (such as an address bus, data bus or combination thereof), a network connection, an inter-process communication data structure, or any other means for communicating data.

It should be understood that other arrangements and elements (e.g., machines, interfaces, functions, orders, and groupings of functions, etc.) of the computing system 100 can be used in addition to or instead of those shown by FIG. 1. Further, a computing device 101 may further include some other components, and the components of the computing device 101 may be integrated into any suitable combination, and may be implemented by hardware, firmware, or software.

Figure 2:
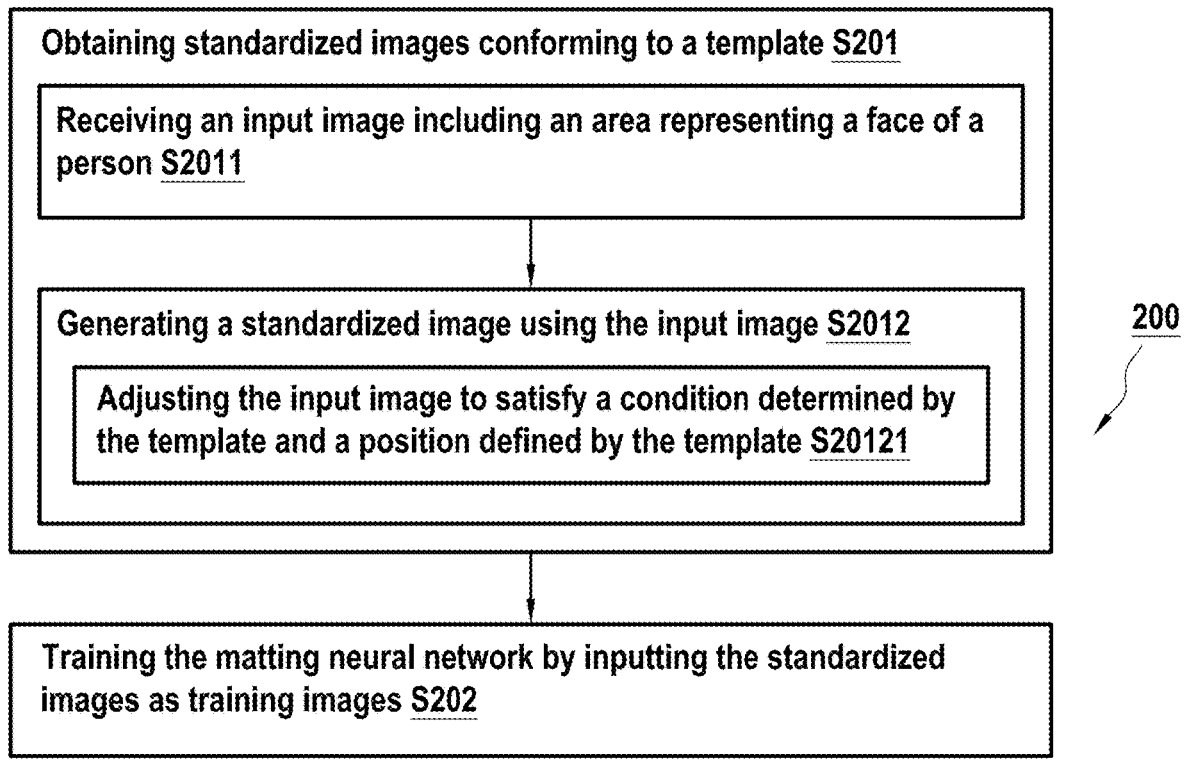
FIG. 2 is a flowchart illustrating a computer-implemented method for training a matting neural network in accordance with the first embodiment disclosed herein.

As illustrated by FIG. 2, a method 200 for training a matting neural network according to the first embodiment of the disclosure includes the following operations S201-S202. The method 200 may be implemented by the computing system 100, which is used as an example below.

The matting neural network is stored in storage component(s) 1012 of the computing system 100. It has a structure same as or different from that of an existing matting neural network.

For example, the matting neural network is a CNN having an encoder-decoder architecture. The encoder or decoder includes modules (or sub-neural networks) similar to those of the encoder or decoder of the U-net, each of which operates on separate inputs to accomplish a different subtask of the image matting process. In addition, the decoder of the matting neural network includes a first module configured to predict a rough mask which segments an image fed into the matting neural network into the three regions, and a second module configured to define each pixel of the blended region as belonging to either the background or the foreground of the image. The decoder further includes a third module configured to fuse the rough mask and the defined information into the final matte to be output by the matting neural network.

At the operation S201, the computing system 100 obtains standardized images. A standardized image within the meaning of the disclosure conforms to a template, which requires the standardized image to depict a human face. The template may be embodied in the instructions to be executed by the one or more processing components 1011 to perform the method 200.

A standardized image is a portrait of a real person which was originally taken with a camera, or a computer-/artificial intelligence-generated picture which looks similar to the former to the extent that the performance of the trained matting neural network is not significantly compromised thereby. The standardized images obtained by the computing system 100 at S201 may vary significantly in background, or in appearance (such as face shape, eye distance, or hairstyle) of the depicted person.

A standardized image may be two-dimensional. The template may further prescribe that the standardized image should depict the full human face in a frontal view, though the human face may be slightly obscured by hair (e.g., bangs) or accessories (e.g. glasses, hat, flowers, etc.) to the extent that the performance of the trained matting neural network is not significantly compromised thereby.

At S201, the computing system 100 produces one or more standardized images via a process to be described below. It may further obtain standardized image(s) using its own camera, receive standardized image(s) from an external device via a network, or retrieve standardized image(s) from a storage component 1012. The obtained standardized images may be organized in a database stored in storage component(s) 1012.

The computing system 100 produces a standardized image via operations S2011-2012.

At the operation S2011, the computing system 100 receives an input image including an area representing the face of a person. The area is a frontal view of the full face of the person if the template so requires.

The input image may be taken with a camera of the computing system 100, be retrieved from a storage component 1012, or, be transmitted from an external device, such as a web server.

Same as every ID template, the template determines a condition to be satisfied by a relationship between the size of the standardized image and the distance between two target points in the standardized image. The two target points represent two parts of the person. The two parts defined by the template may belong to the body (e.g., the face or the neck) of the person; or, at least one of them may belong to clothes or accessories worn by the person. For example, at least one of the two parts covers or is close to a first body part of the person (e.g., one of the parts is at the corner of a shoulder of a suit) to such an extent that the distance between the two parts reflects or approximates the distance between the first body part and a second body part of the person.

As such, it is self-evident that the template further specifies that each standardized image includes the target points. Moreover, same as the dimensions of the standardized image, the distance between the target points may be measured in pixels.

In addition, same as all ID templates, the template further defines that the area representing the visage is at a particular position in the standardized image. For example, it specifies that a pre-determined point within the area must be in the center of the standardized image.

At the operation S2012, the computing system 100 generates the standardized image using the input image. The generating operation S2012 includes an operation S20121 of adjusting the input image so that the relationship between the size of the adjusted input image and the distance between the target points in the adjusted input image satisfies the condition, and the area representing the visage is in the position defined by the template.

As can be appreciated, the generation operation S2012 is only performed when the computing system 100 determines that the received input image fails to satisfy the condition determined by the template or the position defined by the template.

After the standardized images are obtained at S201, at the operation S202, the computing system 100 trains the matting neural network by inputting the standardized images into the matting neural network as training images, so that portraits to be used on identity documents can be created based on mattes generated by the trained matting neural network.

The matting neural network may be any deep learning algorithm(s) suitable for generating mattes, and those which do not require any pre-defined tri-map as an auxiliary input are preferred.

Apart from inputting the training images into the matting neural network and outputting mattes for the training images (hereinafter "training mattes"), the training process S202 further involves comparing the training mattes and reference mattes (also known as ground truth mattes) to determine errors between the training mattes and the reference mattes, which is known in the art. The errors can include incorrectly predicted alpha values for pixels of the training mattes, which are usually determined using loss functions. The errors are then fed back through the matting neural network to appropriately train the matting neural network, for instance, by adjusting the weight of the neurons to reduce the values of the errors.

As is known in the art, this process can be repeated for a sufficiently large number of training cycles, until the matting neural network converges to a state where the error of the calculations is small enough such that the output training mattes reach a desired threshold level of similarity to the reference mattes. In other words, training can continue until predicted alpha values are within a desired threshold level of similarity.

As an example, the computing system 100 may use the stochastic gradient descent algorithms to adjust the parameters of the matting neural network.

The reference matte for the standardized image generated at S2012 can be obtained by applying the same geometric transformation (i.e., the generating operation S2012) to a reference matte for the input image.

By using standardized images conforming to a template to train a matting neural network, the method 200 according to the first embodiment can train an existing matting neural network or develop a new matting neural network to especially facilitate ID photo compositing effectively and efficiently. Comparing with generalized deep learning-based matting algorithms trained by using all kinds of pictures, the matting neural network trained using the method 200 can have a simpler structure (e.g., with fewer neurons or hidden layers) and produce more accurate mattes at a faster speed, making it easier to download, install, or run the matting neural network on a mobile user device after the training has been completed.

In addition, by automatically adjusting a random input image depicting a human face to conform to the template, the method 200 according to the first embodiment can obtain training images of the matting neural network efficiently.

According to an example implementation, to increase the number of training images for the matting neural network, the computing system 100 obtains the foreground of the standardized image generated at S2012 using the reference matte for the generated standardized image, and then generates another standardized image by fusing the obtained foreground with a different background. According to another example, the computing system 100 performs augmentation on any standardized image that has been or to be used for training the matting neural network to further expand the training dataset. The augmentation includes geometric deformations (e.g., scaling, translation, rotation, horizontal flipping, etc.), image color transformations (e.g., adjustment of brightness, contrast, hue, saturation, etc.), or any other type of augmentation (e.g., adding noise, blurring, etc.).

Figure 3:
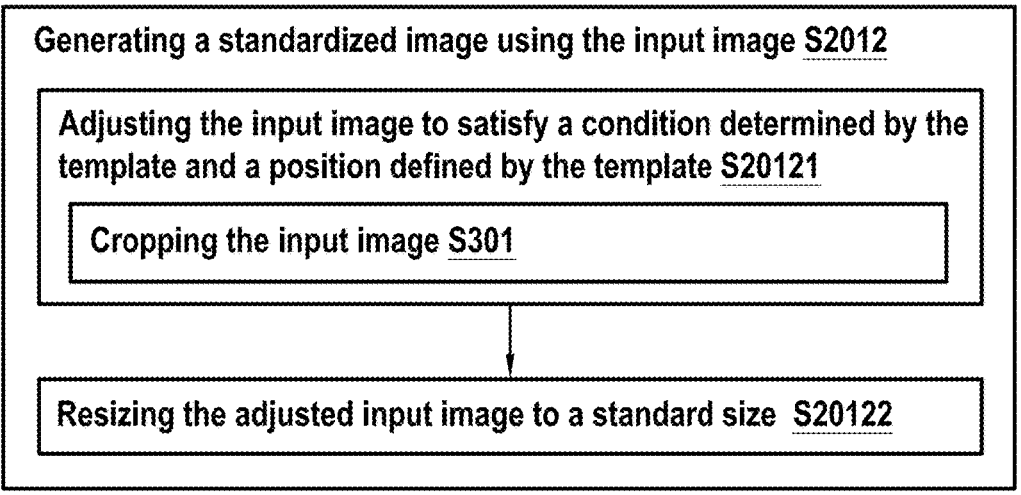
FIG. 3 is a flow chart illustrating a generating operation of the training method according to an example of the first embodiment.

According to an example implementation, as illustrated by FIG. 3, the adjusting operation S20121 includes an operation S301 of cropping the input image. As can be appreciated, the cropped input image includes the area representing the visage and the target points which may or may not be within the area. The cropped input image may be the adjusted input image as defined above, which satisfies the condition determined by the template and the position defined by the template. Or, if such an adjusted input image cannot be obtained only by cropping the input image, then the computing system 100 may enlarge the background of the cropped input image to generate the adjusted input image. The computing system 100 may pad the background to a larger size by zero padding, pixel replication, reflection, extrapolation, etc.

Like all ID photo templates, the template may define a standard size of each standardized image, so as to further enhance the performance of the matting neural network. Accordingly, as illustrated by FIG. 3, the generating operation S2012 further include an operation S20122 of resizing the adjusted input image to the standard size. The computing system 100 may perform image interpolation in the resizing operation S20122 to avoid image distortion. As can be appreciated, the resizing operation S20122 is only performed when the computing system 100 determines that the size of the adjusted input image is different from the standard size.

It is noted that the size of the standardized image is determined by each of its dimension. As such, according to an example implementation, the template determines the condition by defining value(s) of one or more ratios of the standardized image. Each of the one or more ratios refers to the quantitative relation between a dimension (i.e., the length or width) of the standardized image and the distance between the target points in the standardized image.

The template, used for preparing the training images of the matting neural network, specifies one or multiple values for each of the one or more ratios. The multiple values (e.g., a range of values) may approximate to the same center value (e.g., the average of the range) to slightly vary the relative distance between the target points in the standardized images used for training the matting neural network.

The template may further determine the shape of each standardized image according to different ID photo templates. For example, the matting neural network is intended for facilitating generation of US passport photos, and thus the template defines that the dimensions of the standardized image are in a square aspect ratio.

Figure 4:
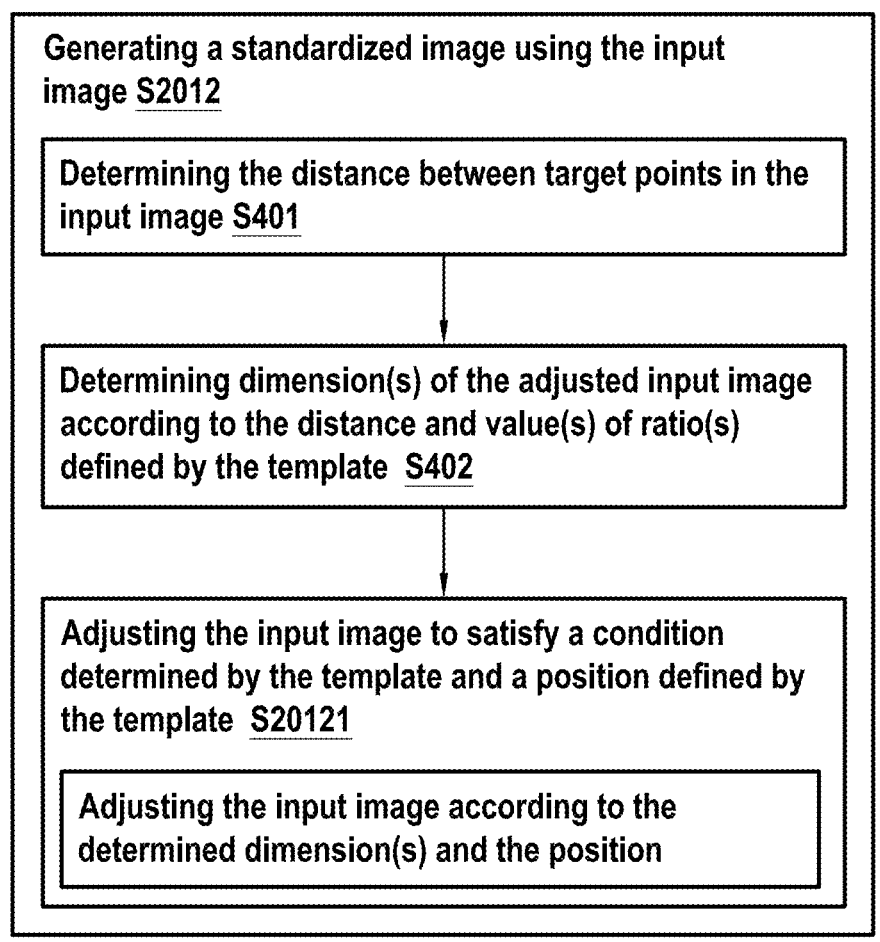
FIG. 4 is a flow chart illustrating the generating operation of the training method according to another example of the first embodiment.

Accordingly, as illustrated by FIG. 4, to adjust the input image to meet the requirements with respect to the condition determined by the template and the position defined by the template, the computing system 100 first determines the distance between the target points in the input image at an operation S401, and then at an operation S402 determines the dimension(s) of the adjusted input image according to the value(s) of the ratio(s) defined by the template and the distance. In particular, at the operation S402, the computing system 100 determines a dimension of the adjusted input image according to one of the defined value(s) of the ratio of the dimension to the distance. The computing system 100 may select the value randomly or according to a pre-defined rule.

Then at the operation S20121, the computing system 100 adjusts the input image to the determined dimension(s) while having the area representing the visage be in the position defined by the template.

Figure 5:
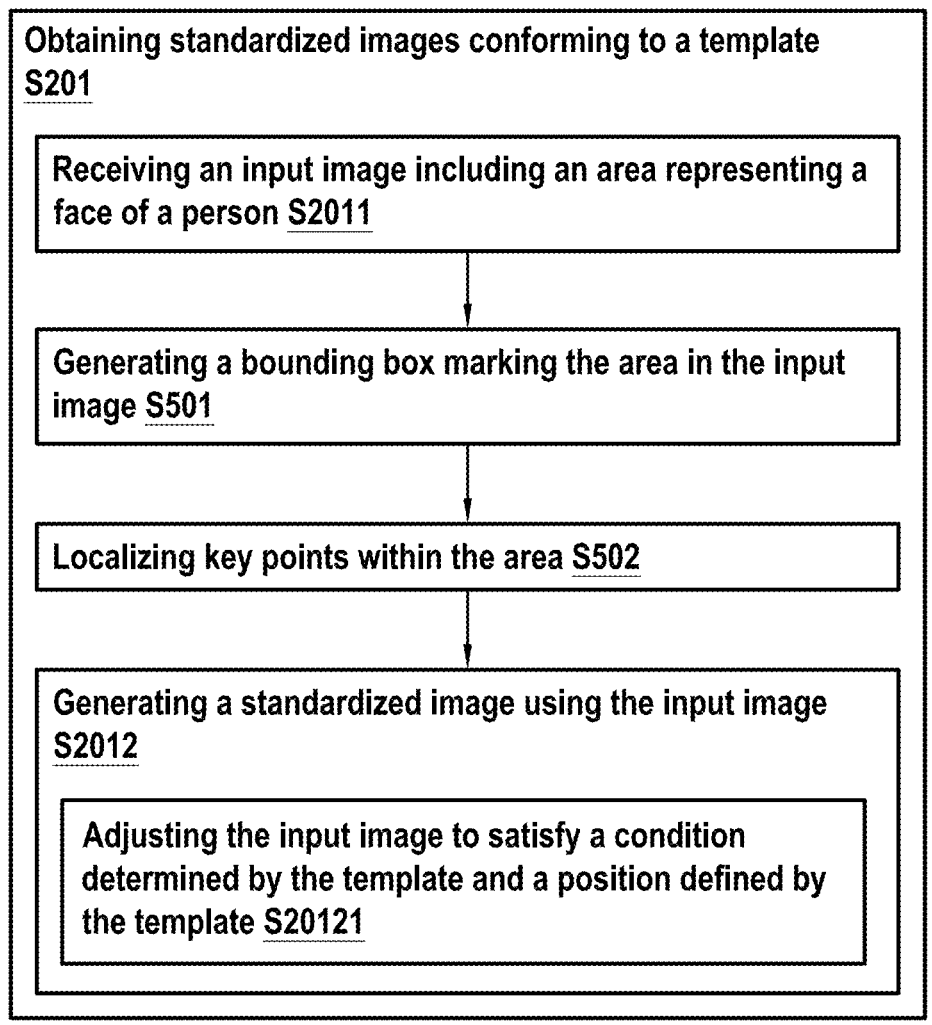
FIG. 5 is a flow chart illustrating an obtaining operation of the training method according to an example of the first embodiment.

As can be appreciated, the computing system 100 locates the area representing the visage in the received input image before standardizing it at S2012. The computing system 100 may use any suitable visage-detection algorithm to detect and locate the area. According to an example implementation as illustrated by FIG. 5, as a result of the detection, at an operation S501 the computing system 100 generates a bounding box marking the area, and then localizes facial key points within the area at an operation S502.

As is known in the art, the facial key points may include points representing centers and corners of eyes, nose tip, etc. The computing system 100 may determine the (x, y) real-valued coordinates of the key points in the space of pixels of the input image. The area representing the visage and the key points can be detected using deep-learning based algorithms or traditional methods such as Haar Cascade algorithm. In addition, to facilitate the adjusting operation S20121, two of the key points are defined as the target points. For example, the distance between the target points corresponds to the width of the face or the distance between eyes of the person. The width of the face may refer to the distance between the left and right zygions of the person. The eye-to-eye distance may refer to the distance between the centers of the pupils or between corners of the eyes. The template may further define that the length of every side of the standardized image is 4 times the distance when the distance corresponds to the face width, or 7 times the distance when the distance corresponds to the eye-to-eye distance, which allows the standardized image to depict all body parts of the person as required by most ID photo templates. As another example, the template may specify that the value of the ratio of the side length to the distance falls within the interval [3.8, 4.2] when the distance corresponds to the face width.

How the computing system performs S20121 after S501 and S502 can be illustrated with a specific example: at S2012, the computing system 100 first determines a square region in the received input image according to the template, and then cuts the region off from the received input image as the adjusted input image. The center of the square region is aligned with the center of the bounding box generated at S501, and the side length of the square region is 4 times as long as the distance, which corresponds to the face width. Or, the center of the square region is aligned with the midpoint between two key points representing centers of the eyes of the person, and the length of the square region is 7 times as long as the distance, which corresponds to the distance between the eye centers.

In some example implementations where the template requires the standardized image to depict a full visage in a frontal view and the area representing the visage in the input image satisfies the requirement, the input image includes views of human faces. As such, to generate the standardized image at S2012, the computing system 100 performs the operations as illustrated by FIG. 6a or FIG. 6b.

Figure 6A:
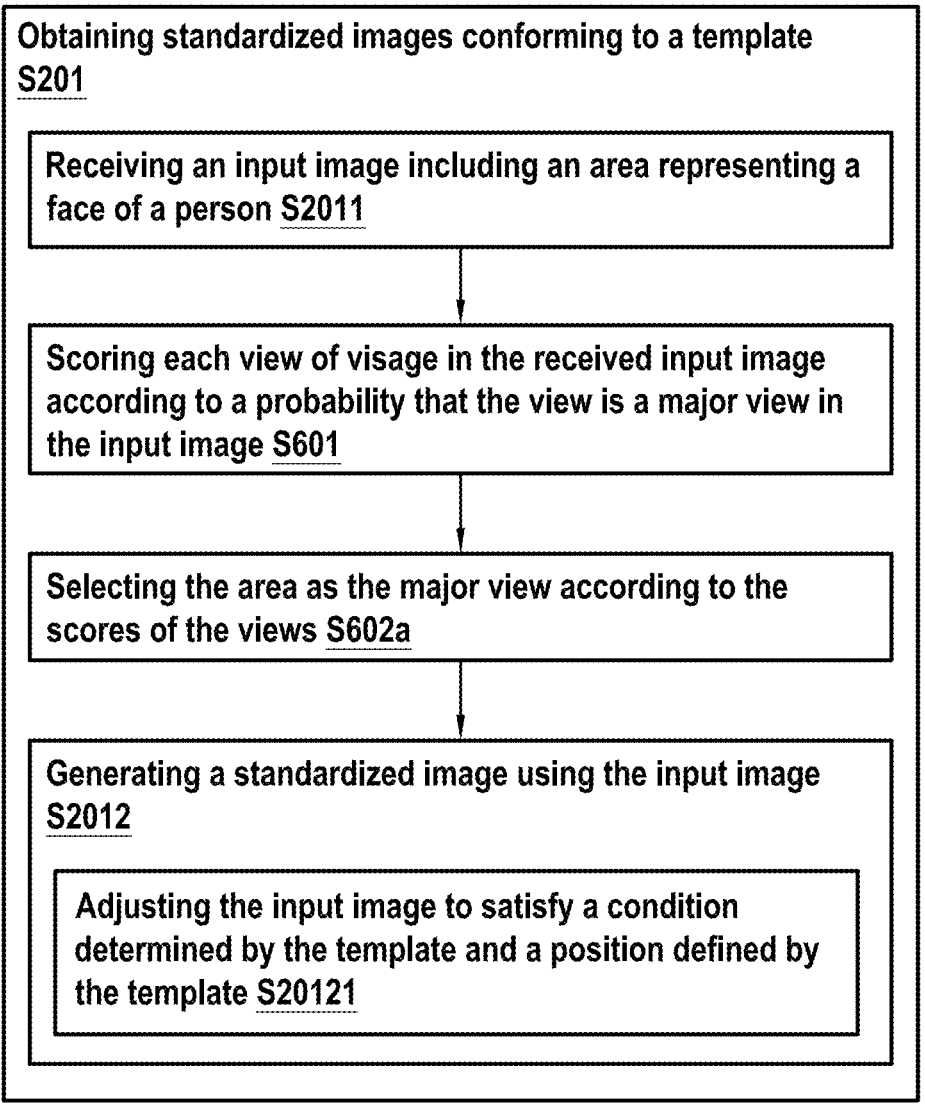
FIG. 6a is a flow chart illustrating the obtaining operation of the training method according to an example of the first embodiment.
Figure 6B:
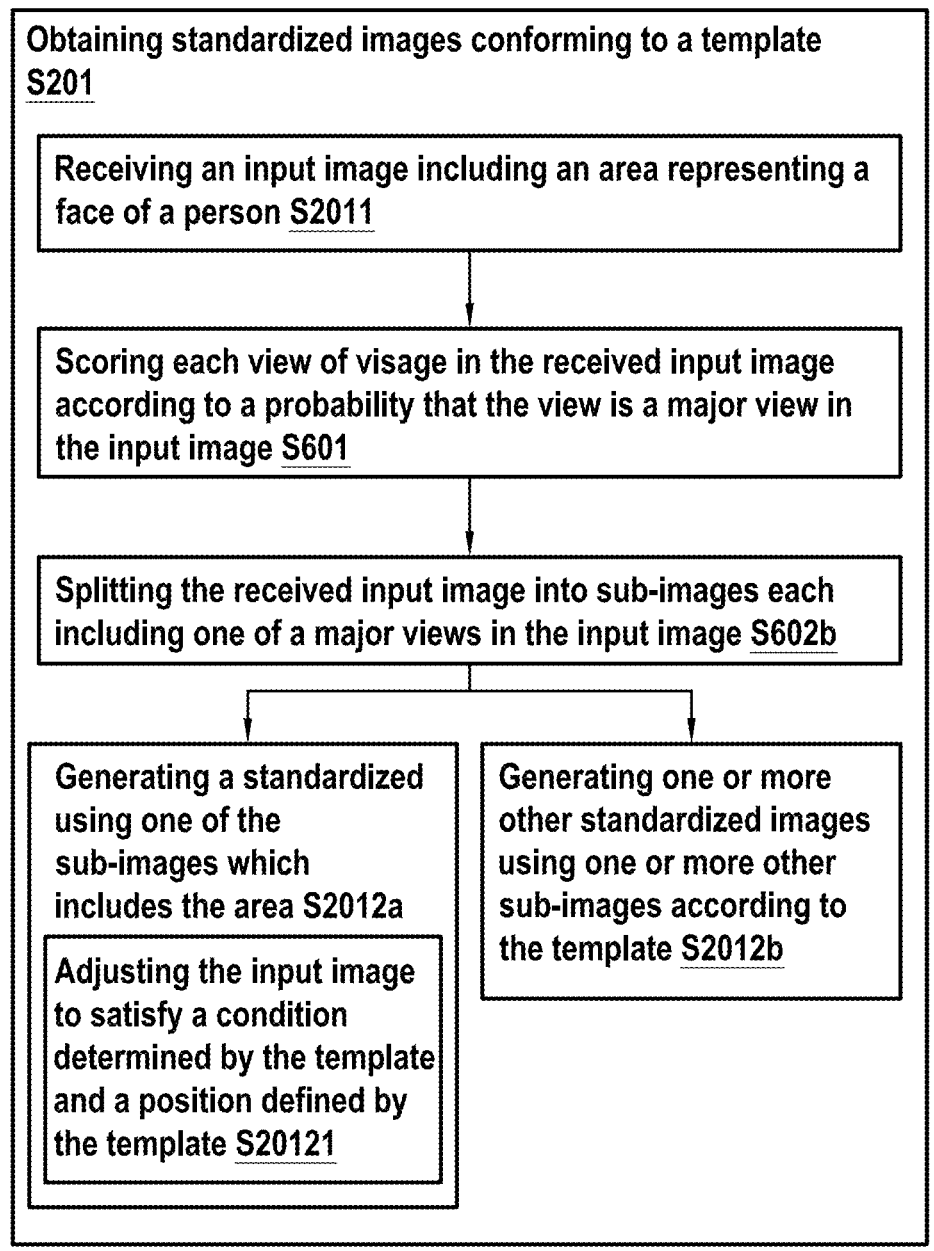
FIG. 6b is a flow chart illustrating the obtaining operation of the training method according to another example of the first embodiment.

At the operation S601 as illustrated by FIGS. 6a and 6b, after receiving the input image at S2011, the computing system scores each view according to the probability that the view is a major view in the input image.

It is contemplated that a major view of an image represents the visage of a person who wants to obtain his/her own ID photo from the image with the help of the matting neural network. The input image received at S2011, which is used for preparing a training image of the matting neural network, can include one or more major views.

The probability of a view being a major view depends on the probability that the view is a frontal view of a full human face, and may take the form of confidence levels. If within all the views of visages in the input image, at least two views have the same highest probabilities of being a frontal view of a full visage, the probability of one of the at least two views being a major view may further depend on the position of the view in the input image, the size of the view, or the distance between the visage represented by the view and the camera with which the input image was taken or appeared to have been taken.

As an example, a view whose score is lower than a threshold score cannot be a major view. A score not lower than the threshold score may only be given to a view if the view includes certain key points (e.g., it should show the human face approximately from the outer corner of one eye to that of another eye or from the top of the forehead to the bottom of the chin), or if the angles of the full visage turning left and right or the angles of the human head tilting up and down vis-à-vis the orientation directly facing the camera are smaller than preset angle(s).

The computing system then performs the operation S602a as illustrated by FIG. 6a or the operation S602b as illustrated by FIG. 6b.

At S602a, the computing system 100 selects the area as the major view in the input image according to the scores of the views. A major view in the input image has the highest score level within the views.

The highest score level may equal to the highest score given to the views at S601, or, the entire range of possible scores may be divided into intervals and the highest score level refers to the interval including the highest score given to the views at S601.

If the input image includes other view(s) having the same highest score level as the area (i.e., it includes multiple major views), the computing system 100 randomly selects one of them at S602a, or, it performs S602b, where it splits the input image into sub-images each including one of the major views of the input image.

The computing system 100 performs S2012 as described above to generate the standardized image after performing S602a. Or, as illustrated by FIG. 6b, after performing S602b, it generates the standardized image using one of the sub-images which includes the area at an operation S2012a and generates other standardized image(s) using the other sub-image(s) according to the template at an operation S2012b.

The computing system 100 may implement S601 after implementing S501 or S502.

According to an example implementation, images that do not depict any visage or depict any full visage in a front view are also input into the computing system 100. As such, after receiving the input image at S2011, the computing system 100 first determines whether the input image depicts any human face, or depicts any full human face in a frontal view if the template so requires. The computing system 100 then standardizes the input image at S2012 as the determination result is positive. It would otherwise discard the input image if the determination result were negative.

Figure 7:
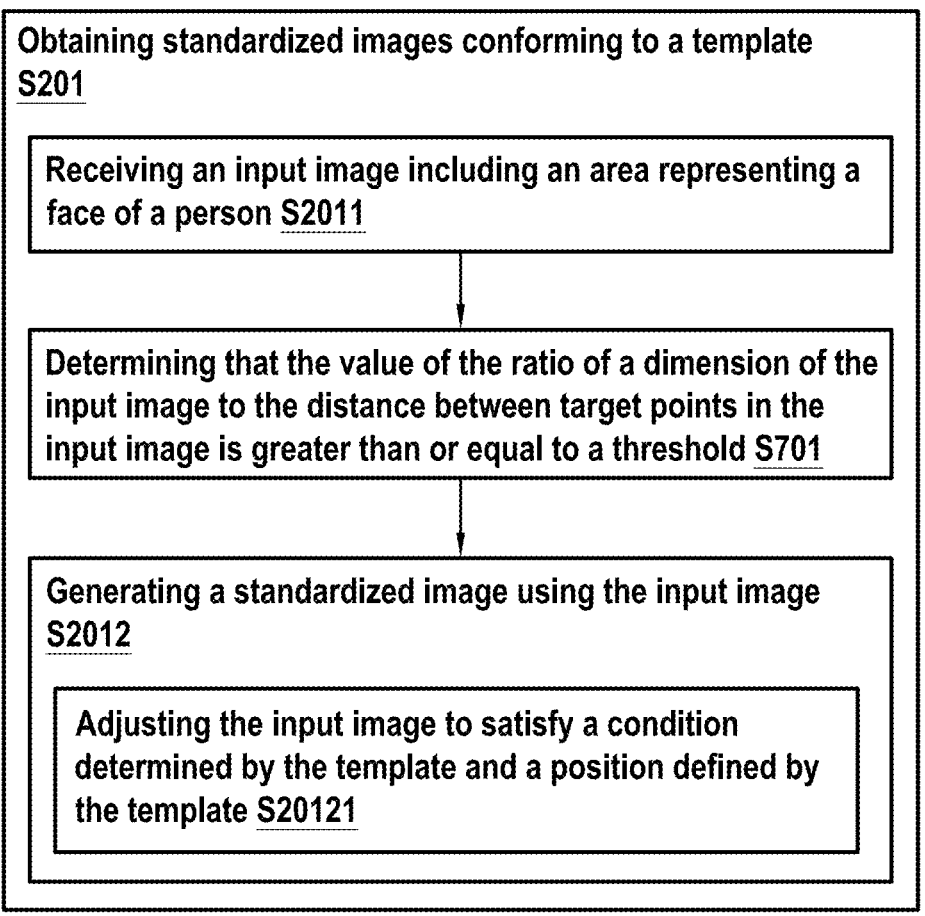
FIG. 7 is a flow chart illustrating the obtaining operation of the training method according to an example of the first embodiment.

The template may require the standardized image to further depict other body part of the person than the face so as to facilitate generation of ID photos conforming to various ID photo templates. For example, it requires the standardized image to depict the person from the top of the head to the collarbone. As such, according to an example implementation, before standardizing the input image received at S2011, to ensure that the input image depicts all the required body part, the computing system 100 determines whether the value of the ratio of a dimension of the input image to the distance between the target points in the input image is not smaller than a threshold. It obtains a positive result at the operation S701 as illustrated by FIG. 7 and performs the generating operation S2012 afterwards. It would otherwise abandon the input image if the value were smaller than the threshold.

Figure 8:
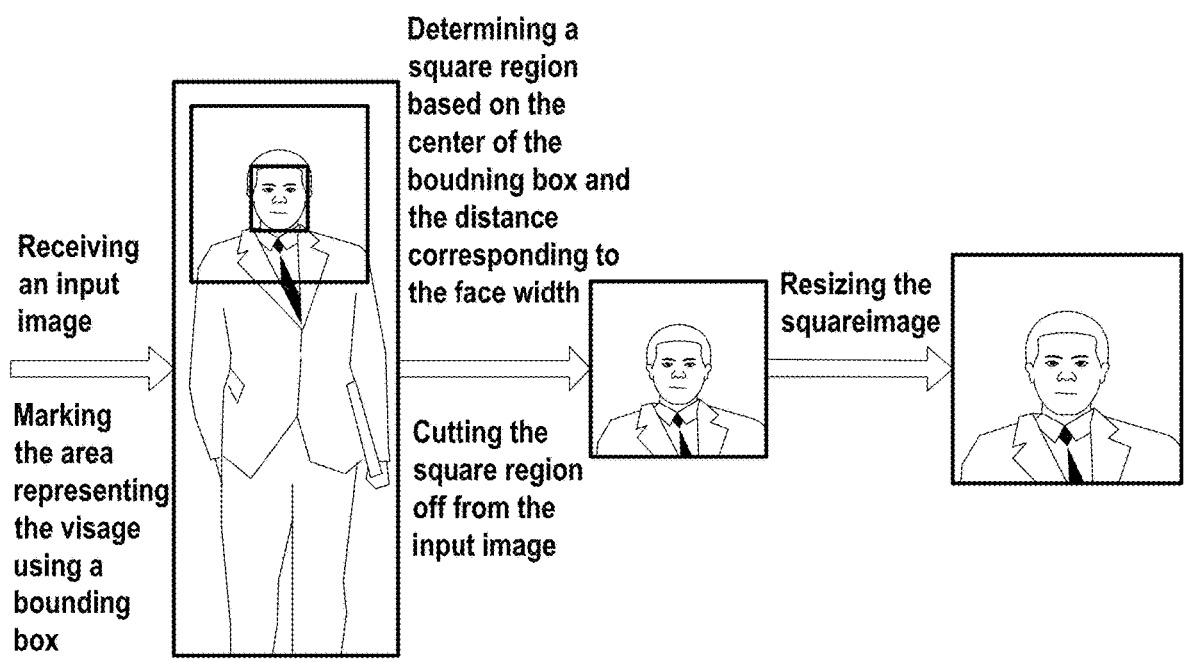
FIG. 8 illustrates an example workflow included in the obtaining operation of the training method according to the first embodiment.

FIG. 8 illustrates an example workflow for obtaining a standardized image at S201. The first sub-figure on the left schematically illustrates the input image, which depicts the full head, upper body and legs of a person and was taken against a random background. The second sub-figure in the middle schematically illustrates the adjusted input image, and the third sub-figure on the right schematically illustrates the generated standardized image.

As illustrated by the first sub-figure, the computing system 100 marks the area representing the face of the person using a bounding box. It then determines a bigger square region whose center is the center of the bounding box and whose side length is decided based on the distance between the target points (corresponding to the face width) and the value of the ratio defined by the template. As illustrated by the second sub-figure, the square region is cut off from the input image as the adjusted input image. The computing system 100 then resizes the adjusted input image according to the standard size defined by the template and obtains a standardized image.

Figure 9:
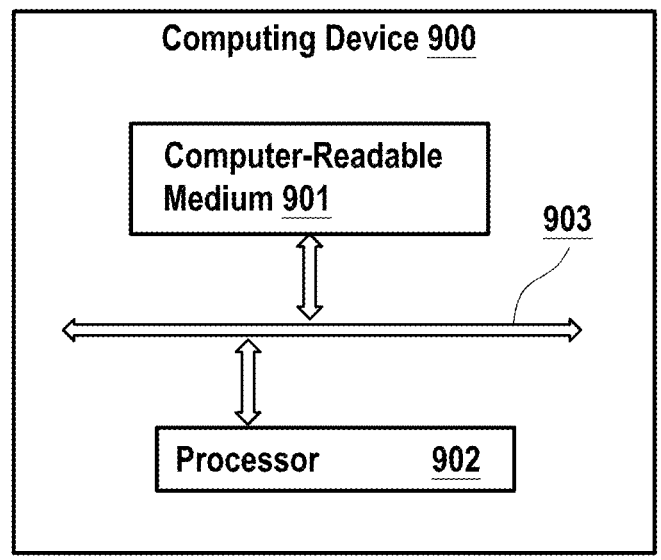
FIG. 9 illustrates an example architecture of a computing system in accordance with the second embodiment disclosed herein.

Referring to FIG. 9, aspects of an illustrative computing system 900 are shown, according to the second embodiment of the disclosure. The computing system 900 may be the same as the computing system 100 illustrated by FIG. 1, and includes one or more computer-readable media 901 and one or more processors 902. The one or more computer-readable media 901 are configured to store instructions, and the one or more processors 902 are configured to execute instructions to perform the method 200 according to any of the implementations of the first embodiment. As is known in the art, the one or more media 901 and the processor(s) 902 may be directly or indirectly coupled to input and output ports, power supplies, etc. (not shown) via one or more buses 903 (such as an address bus, data bus or combination thereof). The bus 903 can include hardware, software, or both that connects the one or more media 901 and the processor(s) 902 of computing system 900 to each other.

Figure 10:
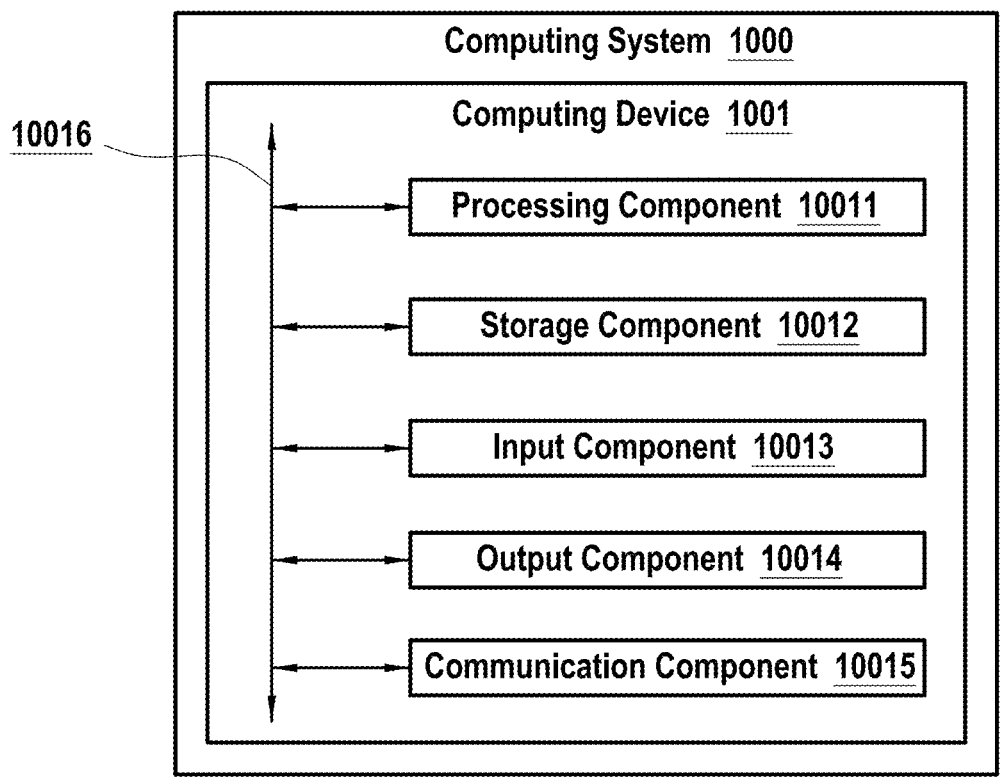
FIG. 10 is a block diagram of an exemplary computing system in accordance with one or more embodiments disclosed herein.

FIG. 10 illustrates an example of a computing system 1000 in which the third embodiment of the disclosure may be employed. As illustrated by FIG. 10, the computing system 1000 includes one or more computing devices 1001 each include one or more processing components 10011, one or more storage components 10012, one or more input components 10013, and one or more output components 10014. It may further include one or more communication components 10015, and a communication channel 10016. The components 10011-10015 and the communication channel 10016 may correspond to the components 1011-1015 and the communication channel 1016 as described above and thus are not described in detail.

As an example, the computing system 1000 includes a user device 1001 or a remote server 1001. To perform the method according to the third embodiment, the user device 1001 runs a locally-installed desktop or mobile application or the remote server 1001 runs a locally-stored web application which can be accessed by a user device through a web browser with a network connection. The application stored on the user device 1001 or the server 1001 is a dedicated application having functionalities for performing corresponding operation(s) of the method, or alternatively is integrated into an operating system.

Further, a computing device 1001 may be a photo kiosk machine, or a to web server delivering online photography service.

Figure 11:
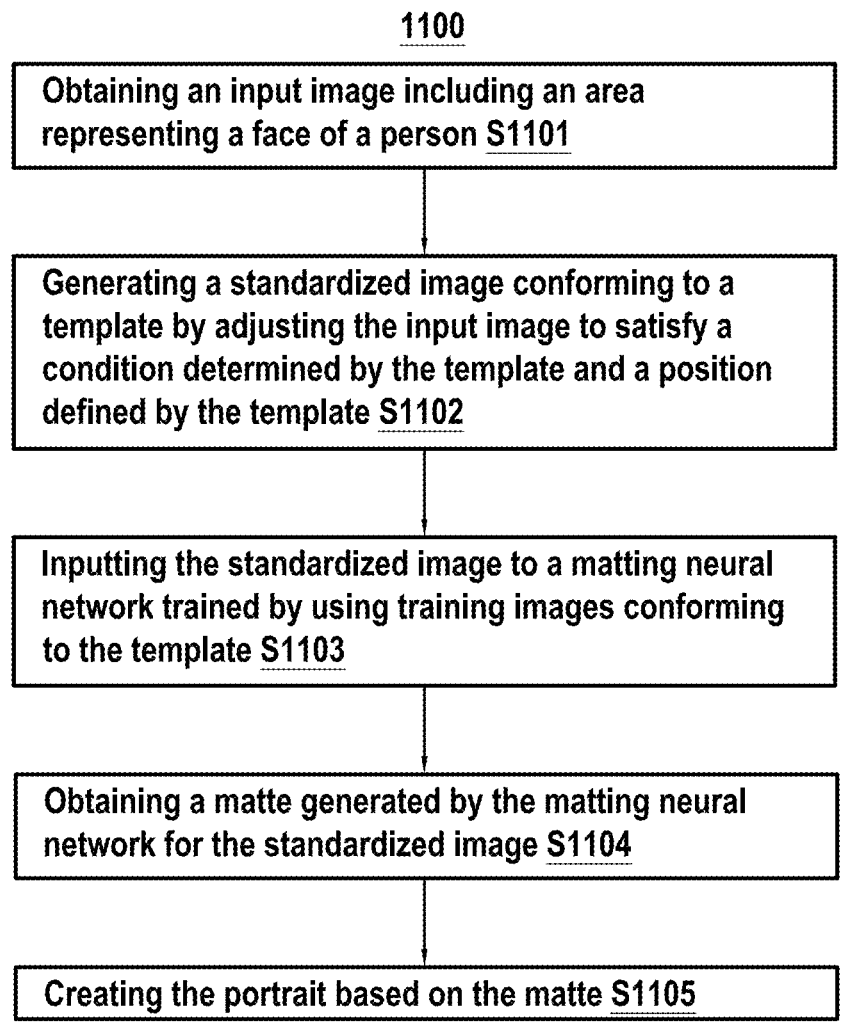
FIG. 11 is a flowchart illustrating a computer-implemented method for creating a portrait to be used on an identity document in accordance with the third embodiment disclosed herein.

As illustrated by FIG. 11, a method 1100 for creating a portrait to be used on an identity document according to the third embodiment of the disclosure includes the following operations S1101-S1105. The method 1100 may be implemented by the computing system 1000 as illustrated by FIG. 10, which as an example includes a user device 1001. It is contemplated that the method 1100 would be implemented at the inferencing phase of a matting neural network.

At the operation S1101, the user device 1001 obtains an input image including an area which represents a face of a person. The input image may be a two-dimensional three-channel color image, taken by a user with the camera of the user device 1001.

At the operation S1102, the user device 1001 generates a standardized image conforming to a template by adjusting the input image. The template prescribes that the standardized image should depict a human face, determines a condition that should be satisfied by a relationship between the size of the standardized image and a distance between target points in the standardized image, and defines a position to be occupied by the area in the standardized image. The target points are as defined in the first embodiment. As such, to standardize the input image, the user device adjusts the input image to satisfy the condition and the position.

At the operation S1103, the user device 1001 inputs the standardized image to a matting neural network which has previously been trained by using training images conforming to the template. The matting neural network may be the one which is trained by using the method 200 according to the first embodiment. It may be trained by a training device (such as a remote server) external to the user device 1001, and then be downloaded to and installed on the user device 1001, so as to reduce the compute resources required by the user device 1001.

The matting neural network generates a matte for the standardized image. As such, at the operation S1104, the user device 1001 obtains the matte via the matting neural network.

At the operation S1105, the user device 1001 creates the portrait to be used on the identity document based on the matte.

The method 1100 according to the third embodiment is intended to be consistent with the training method 200 according to the first embodiment, so as to improve the performance of the trained matting neural network. As such, the example implementations of and details associated with S2012 and the operations performed between S2011 and S2012 according to the first embodiment apply, mutatis mutandis, to the third embodiment.

In particular, the templates used for generating the standardized images at S1102 and S2012 are the same, except that while the template used at S2012 may specify multiple values approximating to the same center value for each of the one or more ratios of the standardized image, the template used at S1102 only defines one value for each of the ratio(s), which is the center value of the multiple values, so as to facilitate the generation of ID photos.

Figure 12:
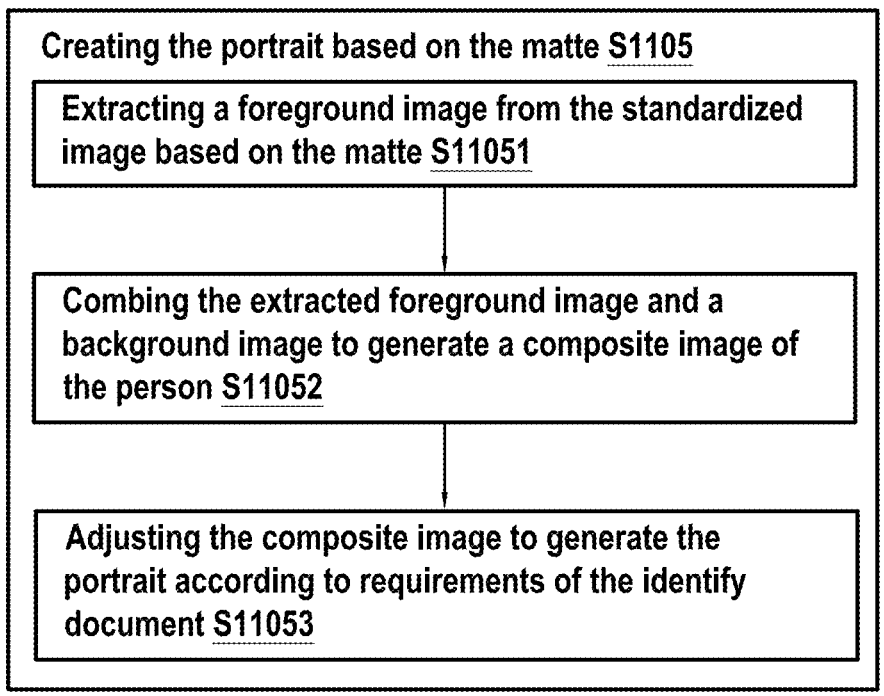
FIG. 12 is a flowchart illustrating the creating operation of the method according to an example of the third embodiment.

As illustrated by FIG. 12, according to an example implementation, the creating operation S1105 f includes the following operation S11051-11053.

At the operation S11051, the user device extracts a foreground image from the standardized image based on the matte obtained at the operation S1104.

As can be appreciated, the foreground image refers to an area representing the person in the standardized image.

At the operation S11052, the user device combines the extracted foreground image and a background image to generate a composite image of the person. The background image may be the same as the background image required by an ID photo template chosen by the user.

At the operation S11053, the user device adjusts the composite image to generate the portrait to be used on the identity document according to requirements of the identity document. As can be appreciated, the operation S11053 is only performed if the composite image does not meet the requirements of the identity document. The adjusting operation S11053 may include cropping or resizing the composite image. For example, the user device may crop and then resize the composite image to generate an ID photo conforming to the ID photo template of the identity document.

Figure 13:
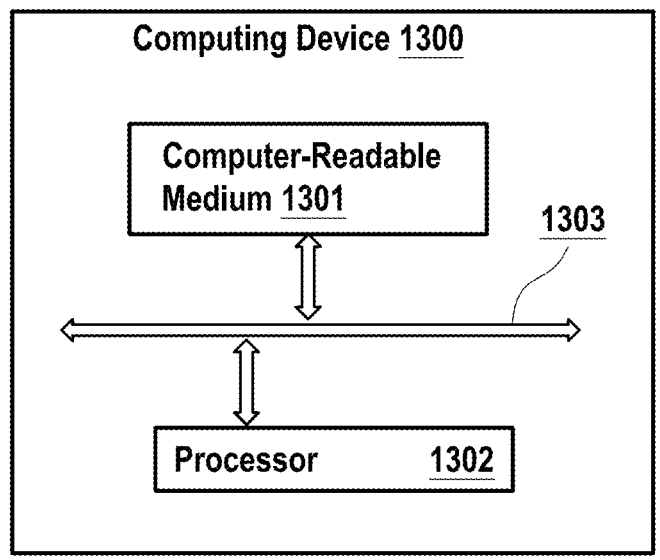
FIG. 13 illustrates an example architecture of a computing device in accordance the fourth embodiment disclosed herein.

FIG. 13 illustrates a computing device 1300 according to the fourth embodiment of the disclosure. The computing device 1300 may be the same as the computing device 1001, and includes one or more computer-readable media 1301 storing instructions, and one or more processors 1302 configured to execute the instructions to perform the method 1100 according to any of the implementations of the third embodiment of the disclosure. As is known in the art, the one or more media 1301 and the processor(s) 1302 may be directly or indirectly coupled to input and output ports, power supplies, etc. (not shown) via one or more buses 1303 (such as an address bus, data bus or combination thereof). The bus 1303 can include hardware, software, or both that connects components of computing device 1300 to each other.

The fifth embodiment of the disclosure provides one or more non-transitory computer-readable media storing instructions which, when executed by one or more processors, cause the one or more processors to implement the method 200 according to any of the implementations of the first embodiment of the disclosure.

The one or more non-transitory computer-readable media according to the fifth embodiment of the disclosure may be the same the storage component 1012 as illustrated by FIG. 1.

The sixth embodiment of the disclosure provides one or more non-transitory computer-readable media storing instructions which, when executed by one or more processors, cause the one or more processors to implement the method 1100 according to any of the implementations of the third embodiment of the disclosure.

The one or more non-transitory computer-readable media according to the sixth embodiment of the disclosure may be the same the storage component 10012 as illustrated by FIG. 10.

Another aspect of the disclosure pertains to a computer program product downloadable from a communication network or recorded on a medium readable by computer or executable by a processor, including program code instructions for implementing the operations of the method according to the first or third embodiment of the disclosure.

This disclosure having been described in particular embodiments, it is clear that it is susceptible to numerous modifications and embodiments within the scope of the disclosure as defined by the following claims.

What is claimed is:

1. A computer-implemented method for training a matting neural network, the method comprising:
    obtaining standardized images conforming to a template prescribing that each standardized image should depict a human face; and
    training the matting neural network to generate mattes for images by inputting the standardized images into the matting neural network as training images so that portraits to be used on identity documents can be created based on mattes generated by the trained matting neural network,
    wherein the obtaining comprises:
    receiving an input image comprising an area representing a face of a person; and
    generating one of the standardized images by adjusting the input image, wherein a relationship between a size of the adjusted input image and a distance between target points in the adjusted input image satisfies a condition determined by the template, the target points represent parts of the person, and in the adjusted input image the area is in a position defined by the template, and
    wherein the obtaining further comprises:
    determining that a value of a ratio of a dimension of the received input image to the distance in the received input image is greater than or equal to a threshold.

2. The method according to claim 1, wherein the template defines one or more values of a ratio of a dimension of the generated standardized image to the distance between the target points in the generated standardized image;
    before adjusting the input image, the generating operation further comprises:
    determining the distance between the target points in the input image; and
    determining the dimension of the adjusted input image according to one of the one or more values of the ratio and the determined distance in the input image; and
    adjusting the input image comprises:
    adjusting the input image according to the dimension of the adjusted input image and the position defined by the template.

3. The method according to claim 1, wherein adjusting the input image comprises cropping the input image.

4. The method according to claim 1, wherein after adjusting the input image, the generating further comprises:
    resizing the adjusted input image to a standard size defined by the template.

5. The method according to claim 1, wherein the template further prescribes that each standardized image should comprise a frontal view of a full human face, and the area is a frontal view of a full face of the person.

6. The method according to claim 5, wherein the input image comprises views of human faces, and before the generating, the obtaining further comprises:
- scoring each of the views in the received input image according to a probability that the view is a major view in the received input image; and
- selecting the area as the major view, wherein the area has a highest score level within the views; or, splitting the received input image into sub-images each comprising one of major views of the input image, wherein the area is one of the major views, the generating comprises generating the standardized image using one of the sub-images, the sub-image comprises the area, and the obtaining further comprises generating one or more other standardized images using one or more other sub-images of the received input image according to the template.

7. The method according to claim 1, wherein before the generating, the obtaining further comprises:
- generating a bounding box marking the area in the received input image; and
- localizing key points within the area, wherein the key points comprise the target points.

8. The method according to claim 1, wherein the determining that the value of the ratio of the dimension of the received input image to the distance in the received input image is greater than or equal to a threshold is performed before the generating.

9. A computer-implemented method for creating a portrait to be used on an identity document, comprising:
- obtaining an input image comprising an area representing a face of a person;
- generating a standardized image conforming to a template by adjusting the input image, wherein a relationship between a size of the adjusted input image and a distance between target points in the adjusted input image satisfies a condition determined by the template, the target points represent parts of the person, in the adjusted input image the area is in a position defined by the template, and the template prescribes that the standardized image should depict a human face;
- inputting the standardized image to a matting neural network trained by using training images conforming to the template;
- obtaining a matte generated by the matting neural network for the standardized image; and
- creating the portrait based on the matte,
- wherein the method further comprises:
- determining that a value of a ratio of a dimension of the input image to the distance in the input image is greater than or equal to a threshold.

10. The method according to claim 9, wherein creating the portrait based on the matte comprises:
- extracting a foreground image from the standardized image based on the matte;
- combining the extracted foreground image and a background image to generate a composite image of the person; and
- adjusting the composite image to generate the portrait according to requirements of the identity document.

11. The method according to claim 9, wherein the template defines a value of a ratio of a dimension of the standardized image to the distance between the target points in the standardized image, and the adjusting is performed according to the value and the position.

12. The method according to claim 9, wherein after adjusting the input image, the generating further comprises: resizing the adjusted input image to a standard size defined by the template.

13. The method according to claim 9, wherein the template further prescribes that the standardized image should comprise a frontal view of a full human face, the area is a frontal view of a full face of the person, the input image comprises views of human faces, and before the generating, the method further comprises:
- scoring each of the views in the obtained input image according to a probability that the view is a major view in the obtained input image; and
- selecting the area as the major view, where the area has a highest score level within the views.

14. The method according to claim 9, wherein the determining that the value of the ratio of the dimension of the obtained input image to the distance in the obtained input image is greater than or equal to a threshold is performed before the generating.

15. A computing system for training a matting neural network, comprising:
- one or more computer-readable media storing instructions; and
- one or more processors configured to execute the instructions to:
- obtain standardized images conforming to a template prescribing that each standardized image should depict a human face; and
- train the matting neural network to generate mattes for images by inputting the standardized images into the matting neural network as training images so that portraits to be used on identity documents can be created based on mattes generated by the trained matting neural network;
- wherein in obtaining the standardized images, the one or more processors are configured to:
- receive an input image comprising an area representing a face of a person; and
- generate one of the standardized images by adjusting the input image, wherein a relationship between a size of the adjusted input image and a distance between target points in the adjusted input image satisfies a condition determined by the template, the target points represent parts of the person, and in the adjusted input image the area is in a position defined by the template, and
- wherein in obtaining the standardized images, the one or more processors are further configured to determine that a value of a ratio of a dimension of the received input image to the distance in the received input image is greater than or equal to a threshold.

16. The computing system according to claim 15, wherein the template defines one or more values of a ratio of a dimension of the generated standardized image to the distance between the target points in the generated standardized image;
- in generating the standardized image, the one or more processors are further configured to, prior to adjusting the input image:
- determine the distance between the target points in the input image; and
- determine the dimension of the adjusted input image according to one of the one or more values of the ratio and the determined distance in the input image; and
- in adjusting the input image, the one or more processors are configured to:
- adjust the input image according to the dimension of the adjusted input image and the position defined by the template.

17. The computing system according to claim 15, wherein in generating the standardized image, the one or more processors are further configured to:
  resize the adjusted input image to a standard size defined by the template after adjusting the input image.

18. A computing device for creating a portrait to be used on an identity document, comprising:
  one or more computer-readable media storing instructions; and
  one or more processors configured to execute the instructions to:
  obtain an input image comprising an area representing a face of a person;
  generate a standardized image conforming to a template by adjusting the input image, wherein a relationship between a size of the adjusted input image and a distance between target points in the adjusted input image satisfies a condition determined by the template, the target points represent parts of the person, in the adjusted input image the area is in a position defined by the template, and the template prescribes that the standardized image should depict a human face;
  input the standardized image to a matting neural network trained by using training images conforming to the template;
  obtain a matte generated by the matting neural network for the standardized image; and
  create the portrait based on the matte,
  wherein the one or more processors are further configured to execute the instructions to:
  determine that a value of a ratio of a dimension of the input image to the distance in the input image is greater than or equal to a threshold.

19. The computing device according to claim 18, in creating the portrait based on the matte, the one or more processors are further configured to:
  extract a foreground image from the standardized image based on the matte;
  combine the extracted foreground image and a background image to generate a composite image of the person; and
  adjust the composite image to generate the portrait according to requirements of the identity document.

20. The computing device according to claim 18, wherein the input image comprises views of human faces, and in executing the instructions, the one or more processors are further configured to, prior to generating the standardized image:
  score each of the views in the obtained input image according to a probability that the view is a major view in the obtained input image; and
  select the area as the major view, wherein the area has a highest score level within the views.

* * * * *